March 10, 1953 J. S. BOZEK 2,630,904
ARTICLE TIMING AND INDEXING MECHANISM
Filed Jan. 28, 1952 4 Sheets-Sheet 1

INVENTOR.
JOHN S. BOZEK.
BY
Joseph B. Lindecker,
ATTORNEY.

March 10, 1953 — J. S. BOZEK — 2,630,904
ARTICLE TIMING AND INDEXING MECHANISM
Filed Jan. 28, 1952 — 4 Sheets-Sheet 3

INVENTOR.
JOHN S. BOZEK.
BY Joseph B. Lindecker
ATTORNEY.

March 10, 1953 J. S. BOZEK 2,630,904
ARTICLE TIMING AND INDEXING MECHANISM
Filed Jan. 28, 1952 4 Sheets-Sheet 4
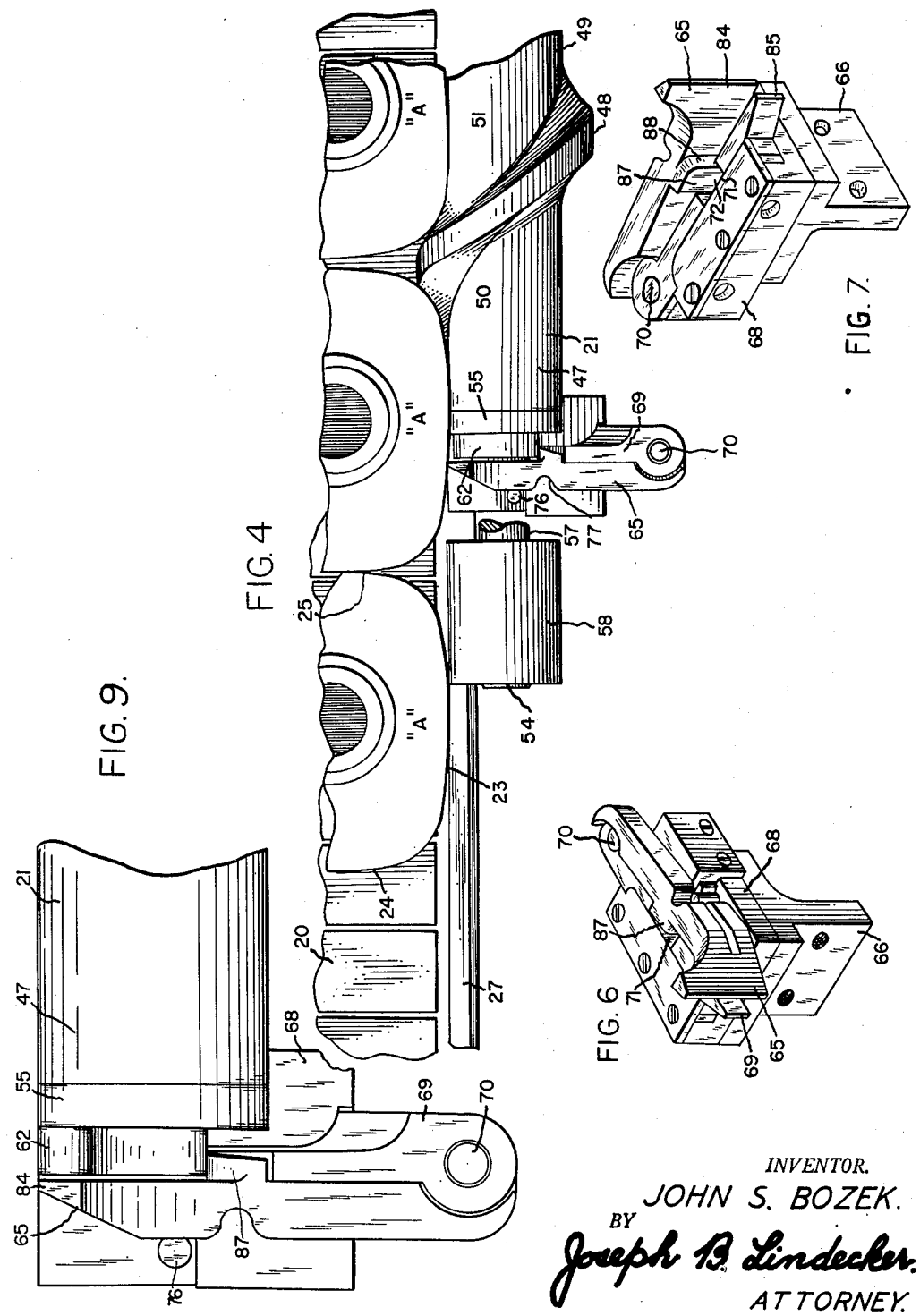
INVENTOR.
JOHN S. BOZEK.
BY
Joseph B. Lindecker.
ATTORNEY.

Patented Mar. 10, 1953

2,630,904

UNITED STATES PATENT OFFICE 2,630,904

ARTICLE TIMING AND INDEXING MECHANISM

John S. Bozek, Franklin Park, Ill., assignor to Standard Packaging Corporation, Chicago, Ill., a corporation of Virginia Application January 28, 1952, Serial No. 268,498

15 Claims. (Cl. 198—34)

The present invention relates to timing and indexing mechanisms for use with articles which are positioned at random on a conveyor and has particular reference to a mechanism wherein filled bottles which are incorrectly positioned on the conveyor are repositioned in indexed, or timed relation, whereby they may be fed continuously and in succession to a rotary timing screw for conducting them to a bottle closure sealing machine or the like.

This invention contemplates a mechanism which is particularly suitable for use with articles such as filled glass bottles, or the like, and which may be inserted adjacent a conveyor connecting different machines in a line, as for example, a bottle filling machine and a bottle closure applying and sealing machine, wherein the discharge of bottles from the first machine is not timed with the operation of the second machine. In such a situation, it is essential that the filled bottles be accurately indexed into the second machine to avoid the possibility of having them crushed by the feed-in device of the second machine.

In the present mechanism a pivotally mounted stop, or trip, finger is located on a movable block located adjacent a conveyor having a continuously advancing conveyor chain and is actuated by the leading edge of a bottle supported upon said advancing conveyor chain to momentarily halt its forward progress until it is properly timed or indexed. The finger is then automatically withdrawn from the edge of the bottle when said block is moved laterally by a cam mounted upon the end of a continuously rotating timing screw operated by suitable power driven means. The released and timed bottle is thereupon advanced by the conveyor chain into a groove or pocket of said rotating timing screw for delivery to an infeed star wheel of a closure applying and sealing machine as described in a copending application, Serial No. 225,782, filed May 11, 1951, and assigned to the same assignee as the assignee of this application.

The size and contour of the cam mounted upon the end of the continuously rotating timing screw is preferably shaped for different size bottles, just as the size and contour of the grooves or pockets vary in different size timing screws for different sized bottles. Every bottle which is initially positioned on the conveyor is momentarily intercepted by the stop, or trip, finger and then allowed to proceed uninterruptedly into the first groove or pocket of the timing screw.

On the other hand, every bottle which is untimed or mispositioned on the conveyor, i. e. which is not positioned within the allowable limits and which would be broken or crushed should it be permitted to proceed uninterruptedly into a groove or pocket of the timing screw, is halted by the stop finger until it is properly timed and positioned to be safely received by the timing screw.

The mechanism is designed so that a row of abutting bottles may be safely fed by the conveyor chain to the timing screw provided the first container in the row is properly indexed. The trip finger therefore operates to index the first bottle in such a row, and is thereafter positioned between adjacent bottles and smoothly operated by contacting succeeding bottles in the row without disturbing the continuous flow of bottles. When a break in the continuity of the row occurs, the trip finger once more becomes operative to time and/or correct the position of the next bottle to be fed to it, should such correction be necessary.

An object of the invention is to provide an indexing mechanism which stops the advance of a bottle which is untimed and/or mispositioned on a continuously moving conveyor chain until it is properly positioned on the latter.

Another object of the invention is to provide a mechanism which will index isolated bottles or closely spaced and/or abutting bottles delivered at random on a conveyor chain so they may be safely fed in spaced order into a feeding device such as a rotary timing screw which will move the bottles to any desired machine, as for example to an infeed star wheel of a closure applying and sealing machine or the like.

A further object is to provide an indexing, and/or a timing mechanism wherein the indexing operation is performed partially by the bottles being indexed, and partially by devices which operate continuously and independently of the bottle.

An additional object is to provide an indexing mechanism wherein the trip finger which performs the timing and/or indexing operation is tripped by each bottle which is positioned on a conveyor chain but will allow abutting bottles to travel without having their positions on the conveyor changed once the first bottle is properly timed and/or indexed and allowed to pass to a suitable rotating timing screw as desired.

Still another object is to provide a mechanism including a continuously rotating timing screw which is so formed with a cam at one end thereof, that in conjunction with a continuously moving horizontal conveyor chain and a trip finger device, the mechanism will stop the advance of a bottle which is mispositioned on the conveyor chain until it is properly timed and positioned on the latter, and then allows the bottle to advance with the conveyor chain and come in contact with the rotating timing screw so that the bottle will move at a desired rate irrespective of the degree of friction between the bottle and the conveyor, and will also operate to gradually increase the spaced relation between a plurality of bottles that may be delivered to an infeed star wheel, or the like, by the conveyor chain in a positive manner and without danger of injuring the bottles being conveyed or spilling any contents thereof.

Numerous other objects and advantages of the invention will be apparent as it is better understood from the following description, which, taken in connection with the accompanying drawings, discloses a preferred embodiment thereof.

Referring to the drawings:

Figure 4 is an enlarged fragmentary view similar to Figure 2 but showing the timing mechanism in a different operating position, parts being broken away;

Figure 6 is a perspective view of the timing finger and the operating parts in conjunction therewith;

Figure 7 is a perspective view of the mechanism shown in Figure 6 but showing the mechanism from a different angle;

Figure 8 is an enlarged fragmentary view similar to Figure 2 showing the timing mechanism, parts being broken away;

Figure 9 is an enlarged fragmentary view showing the end of the timing screw with the cam in operating position and in contact with a portion of the timing finger, parts being broken away;

Figure 10 is an enlarged fragmentary view similar to Figure 8, parts being broken away to show the spring between operating parts thereof.

Figure 1:
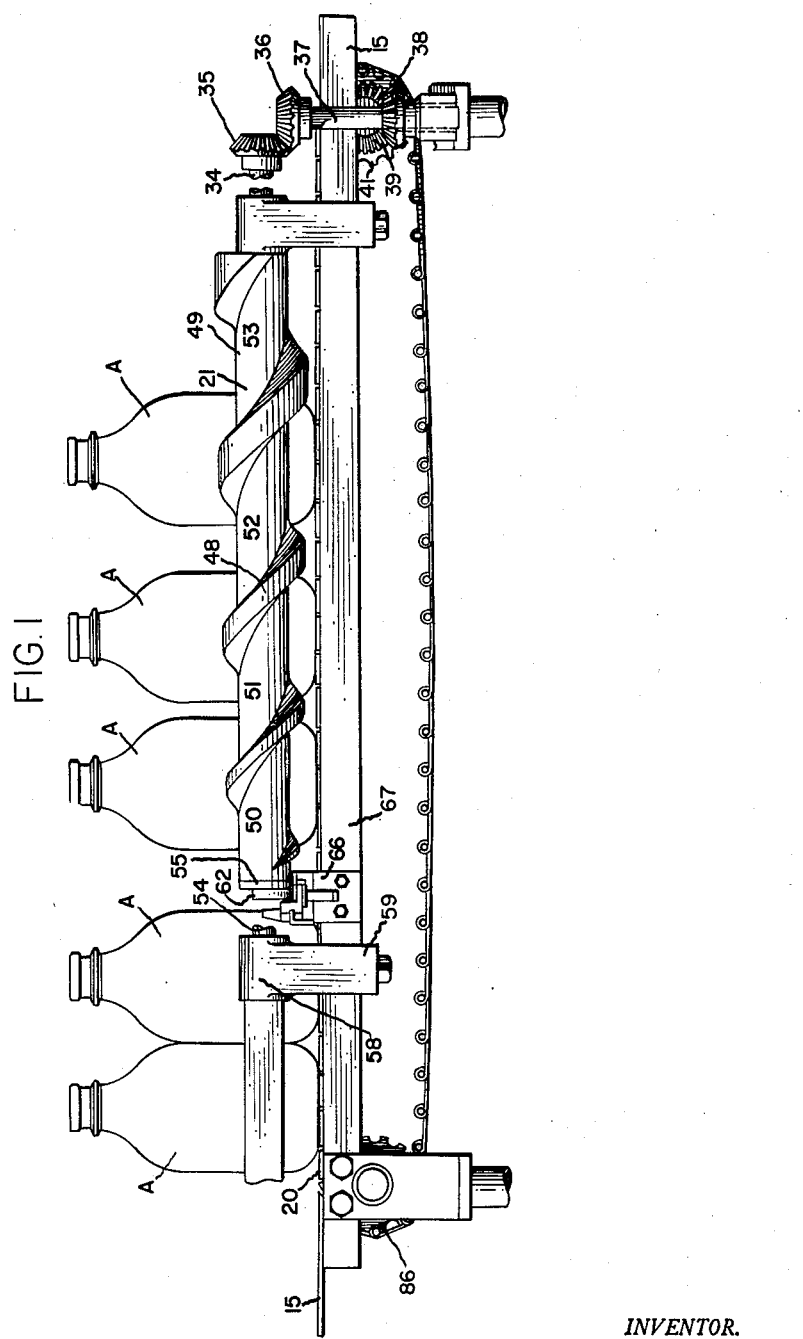
Figure 1 is a side elevational view of a power driven conveyor chain and a timing mechanism constructed in accordance with the principles of the present invention.
Figure 2:
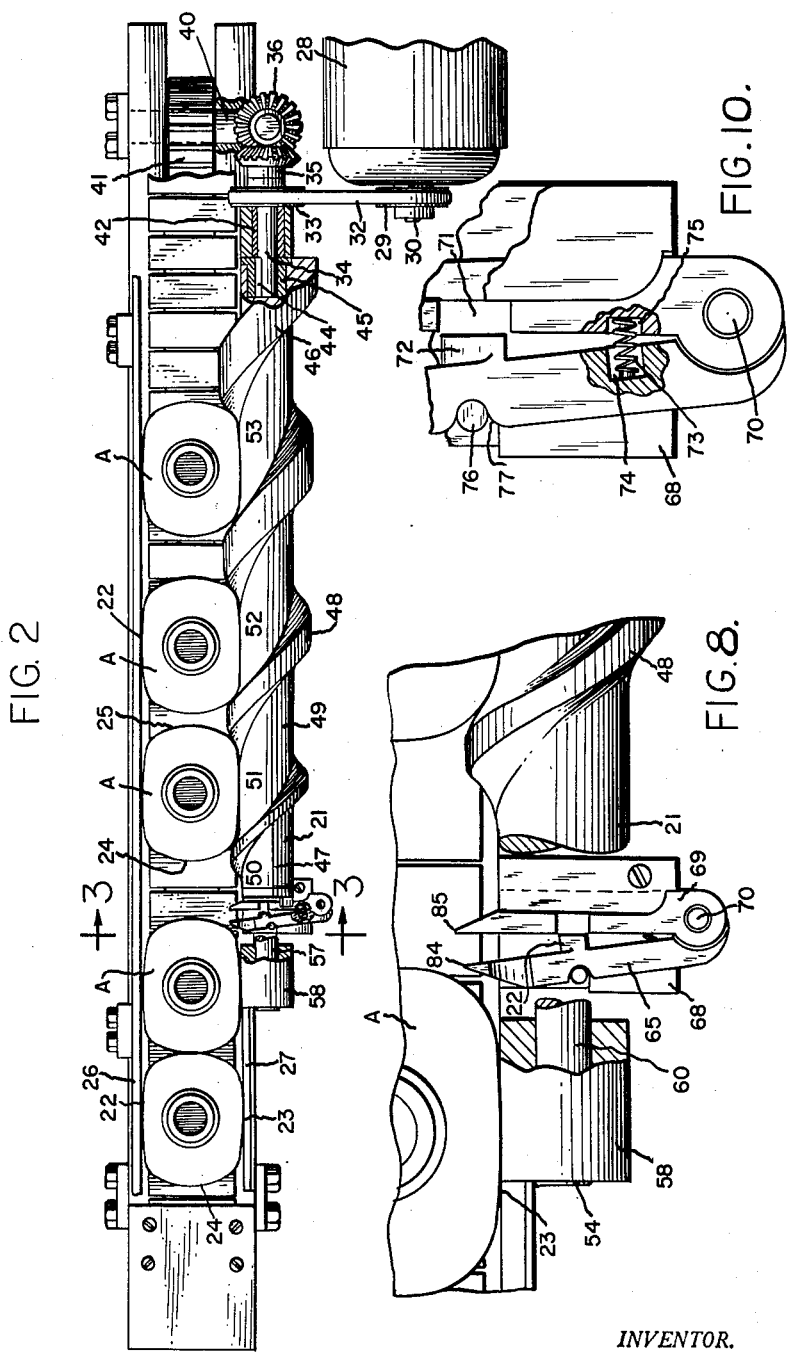
Figure 2 is a top plan view of the conveyor chain and timing mechanism shown in Figure 1.
Figure 3:
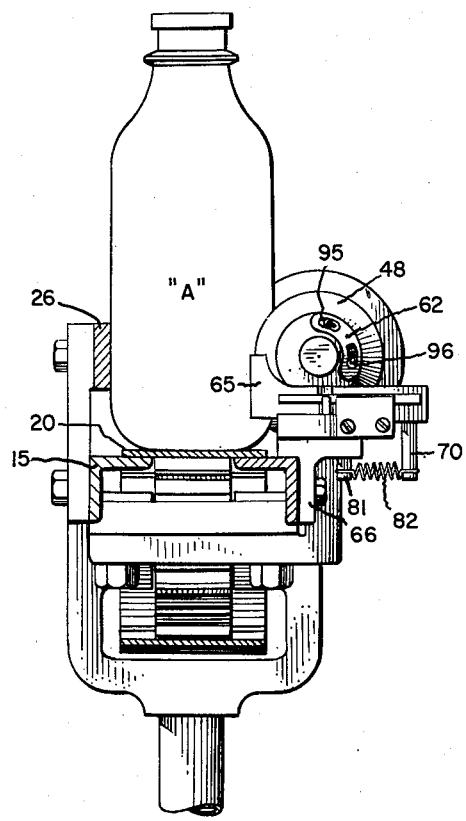
Figure 3 is a sectional view taken substantially on the line 3—3 in Figure 2, parts being broken away.

As an exemplary embodiment of the present invention the drawings illustrate a mechanism wherein bottles A which are advanced at random or in untimed position by a conveyor chain 20 are indexed and delivered to a rotating timing screw 21 which in turn feeds them along the stationary conveyor 15, and conveyor chain 20, and gradually increases the spaced relation between the bottles so they may be delivered to any suitable machine, or part thereof such as an infeed star wheel, or the like, of any closure applying and sealing machine.

In the present embodiment of the invention, the bottles A are shown to have two flat sides 22 and 23, and circular end portions 24 and 25, although it should be clearly understood that the invention is capable of use with bottles of round and other shapes.

In the illustrated embodiment of the invention, each bottle A is advanced along the conveyor 15 by conveyor chain 20 and held in alignment by the conveyor side rails 26 and 27. Said conveyor chain 20 is driven by suitable means embodying a motor 28 and a pulley 29 which is mounted upon shaft 30. Said pulley 29 drives a belt 32 which in turn drives a pulley 33 mounted upon shaft 34. One end of shaft 34 is pressed into a bevel gear 35, which is suitably mounted and arranged to drive a bevel gear 36 mounted upon the upper end of a vertical shaft 37. A bevel gear 38 is mounted upon the lower end of said shaft 37 and arranged to be driven by shaft 37. The bevel gear 38 is suitably mounted and arranged to drive a bevel gear 39 rigidly mounted upon shaft 40 which drives the sprocket 41 mounted thereon. Said sprocket 41 pulls the conveyor chain 20 which supports and conveys the bottles A.

The shaft 34 is supported by a bearing 42 and has a bevel gear 35 at one end thereof. Said shaft is provided at its other end with a keyway and key 44. A bushing 45 is pressed into the outlet end 46 of the timing screw 21; said bushing designed to fit over the end of said shaft 34, and the key 44. Therefore, motor 28 drives said conveyor chain 20 and said timing screw 21 through the intermediation of said pulleys, shafts, and bevel gears, all independent of the bottles, or the movement thereof.

Figure 5:
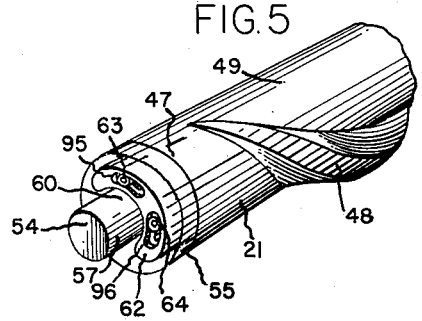
Figure 5 is a fragmentary perspective end view of the timing screw with the timing operating cam mounted on the end thereof.

The timing screw 21 has an inlet end 47 of much smaller diameter than its outlet end 46, and it is provided with a continuous helical rib 48 forming a continuous helical groove 49 which in turn provides a plurality of bottle pockets 50, 51, 52 and 53 in conjunction with the side rails 26 and 27. The inlet end 47 is provided with a cylindrical portion 55 with an adjustable cam 62 attached therewith. Said portion 55 forms a bushing for the inlet end 47 similar to bushing 45 for the outlet end 46 thereof. One end 54 of a stud shaft 57 is removably mounted in a support member 58, the lower end 59 of said support being secured to the stationary conveyor 15. The bearing end 60 of stud shaft 57 is inserted into the bushing formed in cylindrical portion 55 to support the revolving inlet end 47, the withdrawal of end 60 permits the removal and changing of the timing screw 21 where different size screws are needed for different size and shaped bottles used on the conveyor chain 20. Attached to portion 55 is a cam 62 clearly shown in Figure 5. Said cam 62 can be adjusted by means of adjusting members 63 and 64 which are secured and fit within slots 95 and 96 of the cam 62. By moving said cam to a different position with reference to the timing screw 21, the timing of the bottles is changed, the first bottle will enter the first pocket 50 of the screw 21, sooner or later in accordance with the adjustment of said cam. Because said cam is secured to said timing screw 21 it will govern and give perfect timing of the bottles to the first pocket of said screw. The cam is so constructed that the length of the outside circumference thereof is in direct proportion to the width of the traveling bottles upon the conveyor chain 20.

The complete timing operation of the bottles depends upon the operation of the stop finger 65 and associated parts, or mechanism, along with said cam 62, as clearly shown by Figures 6 and 7. Said timing mechanism consists of a bracket 66 which is secured to the angle iron support 67 which forms a part of the stationary conveyor 15 and serves as a support for the conveyor chain 20. A horizontally arranged plunger base 68 is secured to said bracket 66 by suitable means. Said base 68 is provided with a channel to receive two sliding fingers 65 and 69 which are hinged together by means of a vertically arranged stud 70, thereby providing a pivot point for said stop finger 65 as finger 69 only moves laterally with respect to said base while finger 65 moves laterally and also pivots in a horizontal manner. Said finger 69 only moves toward and away from said conveyor chain 20 as controlled by the cam 62. Said finger 69 is provided with a cut-out portion 71 for receiving a tooth 72 formed on one side of finger 65. The fingers 65 and 69 are resiliently separated by means of a compression spring 73 having the ends thereof positioned in openings 74 and 75 provided in said fingers 65 and 69 closed to their pivoted ends. A pin 76 arranged vertically in the plunger base serves as a stop means for said finger 65 in counter action to further movement caused by said spring 73. Said finger 65 has a recess therein for receiving said pin 76, and as long as said pin 76 is in said recess 77 neither finger 65 nor 69 can be moved laterally away from the conveyor chain 20. Once the finger 65 is moved laterally in line with the conveyor chain, to relieve said pin 76 from said recess 77 and at the same time move the tooth 72 into cut-out portion 71 of finger 69, the hinged fingers 65 and 69 can be moved laterally away from the conveyor chain 20. A portion of stud 70 extends downwardly from the rear portion of said fingers 65 and 69. A depending pin 81 is positioned in said bracket 66. A tension spring 82 is positioned and secured to said pins 70 and 81 which causes the fingers 65 and 69 to be resiliently held in a forward position whereby the free ends 84 and 85 thereof extend over the conveyor chain 20 if not retracted by said cam 62. The various parts are clearly shown in assembled relation by Figure 10.

In the illustrated embodiment of the invention, each bottle A is advanced along the conveyor 15 by the conveyor chain 20, the bottle having previously been placed upon the chain 20 in random position in any suitable manner, for example by the discharge mechanism of a filling machine. The chain 20 is pulled by the power driven sprocket 41 and kept in proper alignment by means of sprocket 86 at the inlet end of the conveyor. The upper flights of the chain 20 extend above the stationary conveyor 15 so that they engage and support the bottles, which are guided along a predetermined path of travel by said guide rails 26 and 27.

As each bottle advances along the conveyor 15, its forward progress is momentarily halted by its edge portion coming in contact with the end portion 84 of stop finger 65, said finger 65 is actuated by the bottle and moved into close contact with finger 69, the tooth 72 on finger 65 entering the cut-out portion 71 of finger 69. The bottle is stopped from progressing until the fingers 65 and 69 are moved away from the conveyor chain 20.

Rotation of the timing screw 21 in a counter-clockwise direction, when viewed toward its inlet end 21, is brought about through suitable power drive means as previously described. When the lower portion of tooth 72 of finger 65 is in the cut-out opening 71 of finger 69, the upper portion 87 of tooth 72 extends above the upper surface of said finger 69. Said cam 62, revolving with the timing screw 21, travels above the upper surface of finger 69 but will strike the forward face 88 of said portion 87 of tooth 72 whenever said tooth is in said opening 71. Therefore, when the timing screw 21 is substantially in the desired position to receive a bottle in its first pocket 50, said cam 62 will strike face 88 of tooth 72 and force the pivoted fingers 65 and 69 as a unit in a rearwardly direction against the action of spring 82. It must be remembered that the action only takes place when a bottle is holding finger 65 into engagement with finger 69; otherwise the cam 62 passes over the upper surface of finger 69 without coming in contact with the tooth 72.

When said fingers are held in a rearward position by cam 62, as shown by Figure 4, the bottle A is allowed to be carried by the conveyor chain 20 into the first pocket 50 of the timing screw 21 without coming into contact with the helical rib 48 of said screw 21 and becoming crushed or damaged. After each bottle has passed the fingers 65 and 69, said fingers are forced back to the operating position when permitted by said spring 82 and held there until they are removed again by said cam 62. It is evident that the fingers cannot return to operating position under spring pressure until the cam 62 permits them to do so, the duration of the cam action is in proportion to the width of the passing bottles.

As the fingers 65 and 69 are returned to operating position over the conveyor chain 20, the compression spring 73 separates said two fingers and moves the tooth 72 out of opening 71 and out of the way of the cam 62 until the next bottle A comes along and pushes the finger 65 again against finger 69, after which the whole procedure is repeated. By changing the size and position of the cam 62 any size bottle can be perfectly timed. Different size bottles usually require a different size timing screw; therefore the proper size timing screw is generally provided with the proper size cam to allow proper indexing of bottles. The timing screws with proper cams can easily be changed within a short time by any operator by removing stud shaft 57 from the inlet end of any timing screw, replacing the proper timing screw and inserting said stud shaft 57 within the inlet end of the new timing screw.

The above description is given for the operation of the mechanism upon isolated bottles. When a row of abutting bottles is fed the operation of the mechanism is basically the same. The first container of a row of abutting bottles, if it is not properly indexed on the conveyor chain 20, is stopped by the fingers 65 in cooperation with finger 69 in the manner above described and is thus properly indexed on the chain 20. This operation, of course, repositions the whole row of bottles on the conveyor chain 20. Upon the release of the first bottle, and as it travels into the first pocket of the timing screw 21, the succeeding bottles move forward along with the first bottle and are decelerated with it as it engages said first pocket and is eased therein. The second bottle is brought into contact with said finger 65 as said finger projects above the conveyor chain 20 and between the first and second bottle. The procedure is repeated for each succeeding bottle in the row. Because of the size and shape of cam 62 the fingers, once they are contacted by a succeeding bottle, are moved away from the conveyor chain by said cam at the proper time so that each succeeding bottle is substantially allowed to travel along in the conveyor 15 without any interruption.

After the continuity of the row of bottles has been broken, the next bottle to approach the mechanism, if untimed, or mispositioned, is stopped and indexed by the finger 65 in conjunction with finger 69 and the associated parts.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A bottle timing mechanism, comprising a conveyor with stationary side rails and a movable conveyor chain for advancing said bottle, a continuously rotating timing screw for receiving bottles conveyed by said conveyor chain, stop means located adjacent said conveyor chain and actuated by said bottle horizontally and in the direction of movement of the conveyor when the latter is mispositioned on said conveyor chain and is not in proper position to be received by said rotating timing screw, said stop means being spring moved horizontally and transversely of the conveyor to engage and to stop the advancement of the bottle while said conveyor chain advances, and means actuatable independently of said bottle for disengaging said stop means from said bottle when the latter is properly positioned on said conveyor.

2. A bottle timing mechanism, comprising a conveyor with stationary side rails and a continuously moving conveyor chain for advancing said bottle, a continuously rotating timing screw having a helical groove forming a pocket for receiving bottles advanced by said conveyor chain, a stop finger located adjacent said conveyor chain and actuated by said bottle horizontally and in the direction of movement of the conveyor when the latter is out of time to enter said pocket of said continuously rotating timing screw, said stop means being moved by a spring horizontally and transversely of the conveyor to engage and to stop the advancement of the bottle, and cam means actuatable independently of said bottle for disengaging said stop finger from said bottle when the latter is properly timed on said conveyor.

3. A bottle indexing mechanism, comprising a conveyor with a continuously moving conveyor chain for supporting and advancing bottles, a continuously rotating timing screw for receiving the bottles advanced by said conveyor chain, a stop finger located adjacent said conveyor and actuated by said bottle horizontally when the latter is mispositioned, means operated by a spring for normally maintaining said stop finger in extended position to intercept untimed bottles not properly timed to be received by said timing screw, said stop finger operating horizontally for engaging and holding said untimed bottles to properly time them on said conveyor chain, and cam means for moving said stop finger to retracted position to release said properly timed bottles.

4. A mechanism for timing a bottle, comprising a conveyor with a continuously moving conveyor chain for supporting and advancing said bottle, a continuously rotating timing screw for receiving bottles upon said conveyor chain, stop means located adjacent said conveyor chain and actuatable by a bottle horizontally and in the direction of the movement of the conveyor when the bottle is not in timed position to be received by said timing screw, said stop means when actuated having a projecting part to engage the end wall portion of said bottle and to stop the advancement of the latter while said conveyor chain continues to advance said moving conveyor chain maintaining said bottle in engagement with said stop means, and cam type means for withdrawing said stop means from said end wall portion of the bottle when said bottle is properly timed on said conveyor chain.

5. A mechanism for indexing bottles, comprising a conveyor with a continuously moving conveyor chain for supporting and advancing said bottles, a rotating timing screw having spaced grooves for receiving the bottles, a stop finger located adjacent said conveyor chain, spring operated means for normally maintaining said stop finger in operative position and in the path of bottles advancing upon said conveyor chain, bottles engaging said stop finger being untimed for proper receipt into one of said timing screw grooves, said untimed bottles moving said stop finger horizontally and in the direction of the movement of the conveyor into intercepting and holding position to prevent bottle movement with the conveyor chain as long as said stop finger is in extended position, cam type means secured to said timing screw for moving said stop finger to retracted position to release any held and correctly timed bottles.

6. A mechanism for indexing bottles, comprising a continuously moving conveyor chain for supporting and advancing said bottles, a timing screw having spaced helical grooves for receiving the bottles, a stop finger located adjacent said conveyor chain, spring operated means for normally maintaining said stop finger in operative extended position to intercept bottles untimed for receipt into one of said timing screw grooves, cam means secured to said timing screw moving said stop finger to inoperative position to release said bottles when correctly positioned on said conveyor chain for receipt into said timing screw groove, said spring operated means operable to cause said stop finger to return to operative position, and said cam means for moving said stop finger when tripped and moved horizontally by a bottle to its inoperative position so that succeeding bottles properly timed on said conveyor chain will pass by said finger uninterruptedly.

7. A mechanism for indexing bottles, comprising a conveyor with a continuously moving conveyor chain for supporting and advancing said bottles, a continuously rotating timing screw having helical ribs and grooves, said grooves for receiving the bottles, a stop finger located adjacent said conveyor chain, spring operated means for normally maintaining said stop finger in extended operative position to intercept and delay advancement of bottles untimed for receipt in the timing screw grooves, cam means for moving said stop finger to inoperative position to release said retarded bottles then correctly timed on said conveyor chains, said spring operated means and said cam means working as a unit for holding said stop finger in operative position for a predetermined period of time and then moving it horizontally to inoperative position at the proper time so that bottles timed correctly on said conveyor chain will contact and pass by said stop finger uninterrupted.

8. A mechanism for indexing bottles, comprising a continuously moving conveyor chain for supporting and advancing said bottles along a predetermined path of travel, a stop finger mounted adjacent said conveyor chain, a pivoted portion at one end of said finger, a stop edge portion at the other end of said finger extending into the path of travel of said bottles and being movable horizontally and in the direction of movement of the conveyor by one of said bottles, said stop edge remaining in contact with said bottle to thereby stop the advancement of the latter, and separate cam type means for withdrawing said stop finger when the bottle is properly timed on said conveyor.

9. A mechanism for timing bottles, comprising a continuously moving conveyor chain for supporting and advancing containers positioned at random thereon, a continuously rotating timing screw having spaced helical grooves for receiving bottles from said conveyor chain, a sliding block mounted adjacent said conveyor chain, spring type means for urging said block horizontally into operative position, a stop finger having its rear end pivotally mounted on said block for horizontal movement thereof and its forward end engageable by bottles on said conveyor chain then passing said block, such bottles being in untimed position for receipt into said helical grooves, said finger being engageable only when said block is in operative position and when so engaged preventing advancement of untimed bottles holding them for correct timing, cam means for moving said block into inoperative position to release said repositioned containers, and cam means connected with said rotary timing screw for moving said block to inoperative position for sufficient time to permit uninterrupted passage of the correctly positioned bottles.

10. A mechanism for indexing bottles, comprising a continuously moving conveyor chain for supporting and advancing said bottles along a predetermined path of travel, a movable block type member mounted adjacent said conveyor chain and arranged to be moved horizontally and transversely therewith, a stop finger pivotally mounted on said block type member for horizontal movement thereof and actuatable by said bottle when said block type member is in a position adjacent to said conveyor chain, the outer end of said finger to project into and engage the lower portion of said bottle to stop the advancement of the latter, and a cam member for moving said block type member horizontally to a position away from said conveyor chain to disengage said stop finger from said bottle when the latter is properly indexed on said conveyor chain.

11. A mechanism for indexing bottles, comprising a continuously moving conveyor chain for supporting and advancing bottles positioned at random thereon, a block type member movably mounted adjacent said conveyor chain so it can be moved horizontally, spring means for urging said block member horizontally into operative position adjacent said conveyor chain, a stop finger pivotally mounted on said block member so it can be moved horizontally, said finger being held in operative position when said block member is in operative position, a contact edge on said stop finger, a portion of said contact edge extending into the path of travel of said bottles to stop said bottles and be moved horizontally by those bottles which are present and untimed on said conveyor chain, cam means secured to a continuously rotating timing screw for moving said block member horizontally into inoperative position to thereby disengage said stop finger from said bottles when said bottles are present, said timing screw for receiving said bottles as they are conveyed by said conveyor chain, and said timing screw having helical ribs and grooves so shaped that it operates to time the bottles by retarding the forward movement thereof through the movement of the conveyor and to actively force a bottle forwardly.

12. A mechanism for timing bottles, comprising a conveyor with a continuously moving conveyor chain for supporting and advancing said bottles along a predetermined path of travel, a continuously rotating timing screw having helical ribs and grooves, said grooves for receiving said bottles, a slidable block member mounted adjacent said conveyor chain so it can be moved horizontally, a stop finger pivotally mounted on said slidable block member so it can be moved horizontally and actuated by said bottle when said slidable block is in position adjacent to said conveyor chain to stop the advancement of the latter, cam means for moving said block horizontally to a position away from said conveyor chain to release said bottle from said stop finger when the bottle is properly timed on said conveyor chain, and spring means associated with said block for holding said block in its forward and operative position, cam means for moving said block horizontally to inoperative position, said cam mounted on the end portion of said rotating timing screw, said spring means and said cam means working as a unit for holding said stop finger and block member in operative position for a predetermined period of time and then moving it to inoperative position at the proper time so that bottles timed on said conveyor chain will contact and pass by said stop finger uninterrupted.

13. A mechanism for timing bottles, comprising a continuously moving conveyor for supporting and advancing bottles positioned at random thereon, a block slidably mounted adjacent said conveyor, spring type means for urging said block horizontally into operative position, a stop finger pivotally mounted on said block so it can be moved horizontally, a contact end on said stop finger, said contact end of said finger when in operative position extending into the path of travel of said bottles and actuated by every bottle which is timed or untimed on said moving conveyor, said finger when in contact with an untimed bottle arranged to stop the advancement of the latter, cam means for moving said block horizontally into inoperative position to thereby disengage said contact end of the stop finger from said bottles, said cam means mounted on the end of a continuously rotating timing screw having helical grooves adapted to receive said timed bottles.

14. A bottle indexing mechanism, comprising a moving conveyor for advancing and supporting bottles positioned at random thereon, a rotary timing screw for receiving said bottles from said moving conveyor, bottle receiving grooves on said timing screw, indexing means adjacent said conveyor and movable horizontally by each of said bottles, a rotary cam means for indexing said bottles into said grooves on said timing screw, said rotary cam means being mounted on the end of said rotary timing screw for rendering said indexing means operative and inoperative, therefore a bottle which is timed and other bottles which are closely spaced behind each other will pass said indexing means without being stopped thereby.

15. A mechanism for timing bottles delivered at random on a continuously moving conveyor, comprising a conveyor with a continuously moving conveyor chain for supporting and advancing said bottles along a predetermined path of travel, a continuously rotating timing screw having helical ribs and grooves for receiving bottles from said conveyor, a slidable block member mounted adjacent said conveyor chain so it can be moved horizontally, a stop finger with its rear end thereof pivotally mounted on said slidable block member so it can be moved horizontally and having its forward end thereof moved by said bottle when said slidable block is in position adjacent to said conveyor chain to stop the advancement of said bottle, cam means for moving said block to a position away from said conveyor chain to release said bottle from said stop finger when the bottle is properly timed on said conveyor chain, and spring means associated with said block for holding said block in its forward and operative position, said cam means moving said block to inoperative position, said cam means being mounted on the end portion of said rotating timing screw, said spring means and said cam means working as a unit for holding said stop finger and block member in operative position for a predetermined period of time and then moving it to inoperative position at the proper time so that bottles timed on said conveyor chain will contact and pass by said stop finger uninterrupted, and said timing screw having the delivery end thereof so shaped that it operates to time the bottles by retarding the forward movement thereof through the movement of the conveyor.

JOHN S. BOZEK.

REFERENCES CITED

The following references are of record in the file of this patent:

UNITED STATES PATENTS

| Number | Name | Date |
|---|---|---|
| 1,355,184 | Taliaferro | Oct. 12, 1920 |
| 1,984,659 | Simmons | Dec. 18, 1934 |
| 2,570,265 | Nordquist | Oct. 9, 1951 |
| 2,571,036 | Heyne | Oct. 9, 1951 |